US006046606A

United States Patent [19]
Chu et al.

[11] Patent Number: 6,046,606
[45] Date of Patent: Apr. 4, 2000

[54] SOFT ERROR PROTECTED DYNAMIC CIRCUIT

[75] Inventors: Sam Gat-Shang Chu; Visweswara Rao Kodali; Michael Ju Hyeok Lee, all of Austin, Tex.

[73] Assignee: International Business Machines Corporation, Armonk, N.Y.

[21] Appl. No.: 09/010,200

[22] Filed: Jan. 21, 1998

[51] Int. Cl.[7] .................... H03K 19/096; H03K 19/094; H03K 19/20
[52] U.S. Cl. .............................. 326/95; 326/112; 326/121
[58] Field of Search ............................. 326/95, 98, 112, 326/119, 121, 122

[56] References Cited

U.S. PATENT DOCUMENTS

| | | | |
|---|---|---|---|
| 4,852,060 | 7/1989 | Rockett, Jr. et al. | 365/154 |
| 4,899,066 | 2/1990 | Aikawa et al. | 326/98 |
| 4,914,629 | 4/1990 | Blake et al. | 365/154 |
| 4,945,066 | 7/1990 | Kang et al. | 437/30 |
| 4,956,814 | 9/1990 | Houston | 365/154 |
| 5,453,708 | 9/1995 | Gupta et al. | 326/98 |
| 5,638,009 | 6/1997 | Sutherland et al. | 326/83 |
| 5,764,089 | 6/1998 | Partovi et al. | 327/200 |
| 5,828,234 | 10/1998 | Sprague | 326/98 |
| 5,841,300 | 11/1998 | Murabayashi et al. | 326/98 |
| 5,852,373 | 12/1998 | Chu et al. | 326/98 |
| 5,867,036 | 2/1999 | Rajsuman | 326/16 |
| 5,892,372 | 4/1999 | Ciraula et al. | 326/96 |
| 5,896,046 | 4/1999 | Bjorksten et al. | 326/98 |

OTHER PUBLICATIONS

B.J. Masters, pp. 3208–3209 IBM Technical Disclosure Bulletin vol. 22, No. 8A, Jan. 1980 "Reduction of Alpha-Induced Soft Errors in Dynamic Memories".

*Primary Examiner*—Michael Tokar
*Assistant Examiner*—Daniel Chang
*Attorney, Agent, or Firm*—Robert V. Wilder; Anthony V.S. England

[57] ABSTRACT

A method and apparatus is effective to preserve logic state potential levels in logic circuitry notwithstanding alpha particle collisions. Cross-coupled circuitry, including active devices, are implemented in a complementary logic circuit arrangement to hold current logic values in the event of a premature switching such as a switching that may be induced by alpha particle collision with the semiconductor logic circuit. Stabilizing transistor switching devices are arranged to sense an inappropriate or premature switching initiation and respond thereto by operating to maintain the appropriate logic levels within the logic circuitry. In one embodiment, the internal node of an upper circuit in a dual-rail logic circuit is connected to a gate terminal of a cross-coupled PFET device in the lower circuit. The cross-coupled PFET device is operable to sense an initiated untimely switching action in the upper circuit and effect a re-application of the holding PFET in the upper circuit to re-establish the appropriate logic potential levels in the upper circuit.

17 Claims, 3 Drawing Sheets

6,046,606

SOFT ERROR PROTECTED DYNAMIC CIRCUIT

FIELD OF THE INVENTION

The present invention relates generally to digital logic signal processing and more particularly to a method and apparatus for preserving and protecting logic state signals within integrated circuits from electrostatic events.

BACKGROUND OF THE INVENTION

As the number of devices in a very large scale integrated (VLSI) circuit chip increases, the individual transistor devices which form its component elementary logic circuits, occupy areas of the chip on the order of a few square microns or less. The quantity of charge which is transferred between field effect transistor devices of that size while carrying out normal switching operations is such that the circuits are very susceptible to electrostatic perturbations.

One ubiquitous source of such perturbations is cosmic energy. Cosmic rays are a highly penetrating form of radiation, which apparently come in all directions from outer space to reach the earth. The primary cosmic rays entering the earth's atmosphere are almost entirely composed of positively charged atomic nuclei which collide with air nuclei high in the atmosphere, thereby forming showers of positively and negatively charged nuclear fragments called secondary cosmic rays. The secondary cosmic rays penetrate all matter at the earth's surface and, as they pass through a material object, they undergo collisions with electrons and nuclei of which the material object is composed, leaving a track of electrostatic charge along the way. The linear charge density along such a track can be typically three-tenths (0.3) Pico-Coulombs per micron, which is on the same scale as the quantity of charge involved in the switching operation of a single field effect transistor on a VLSI chip.

This phenomenon becomes a significant problem in logic circuits composed of such devices since logic circuits must sense logic states and provide outputs based upon such sensed logic states. When semiconductor devices such as the transistors which make up logic circuitry are struck by alpha particles for example, they may experience so called soft errors which may affect a high logic signal and cause it to go to a low logic level, or vice versa, thereby compromising the integrity of the entire logic circuit.

In the past, similar problems have been recognized for storage devices but the solutions to such problems have heretofore been in the form of altering the materials and structures of the semiconductor storage devices and have not been applicable to logic circuitry. Cosmic and alpha particles, also pose a problem to the integrity of dynamic memory storage cells. When an alpha particle strikes a chip at the cell location and causes the charge stored in the cell to be modified such that the stored logical state is changed. Considerable efforts have been made to avoid this type of problem but memory correction schemes have been the primary solution.

The same electrical phenomena occur in CMOS dynamic logic circuits where a signal is stored on the parasitic capacitance of the circuit precharge node. The solutions for memory error correction can not be applied in the case of CMOS dynamic logic circuits and other solutions must be found.

Thus there is a need for a method and apparatus which is effective to increase the reliability of logic circuit devices and reduce the potential for error in such devices which may result from one-time electrostatic events such as an alpha particle and other cosmic energy particle collisions with such devices.

SUMMARY OF THE INVENTION

A method and apparatus is provided which is effective to preserve signal values in processing circuitry notwithstanding alpha particle collisions. A sensing device is operable to restore current signal values in the event of a premature switching such as a switching that may be induced by alpha particle collision with the semiconductor logic circuit. The sensing device is arranged to sense an inappropriate or premature switching initiation and respond thereto by completing a restoring circuit which operates to maintain the appropriate signal levels within the processing circuitry.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Although the present disclosure shows isolated dynamic or domino circuitry for the sake of simplicity, it is understood that the present invention is not limited to isolated logic implementations or logic array implementations but rather also includes systems in which the methodology taught herein is implemented within or as part of a single system CPU or other larger semiconductor system, "chip", processor or integrated circuit. Also, in the present example, the terms "source" or "source potential" or "VDD" are used interchangeably to refer to a logic 1 or high level potential. Also the terms "zero level", "ground potential", or "ground" are also used interchangeably to refer to a logic 0 or low level potential.

In general, the term domino logic is used to refer to an arrangement of logic circuit stages which may, for example, be cascaded together in an integrated circuit array configuration. The term "dynamic" refers to a circuit that is synchronized with a clock signal. A signal may be input to a first domino stage where it is evaluated in order to provide an output signal to a second stage where that output signal is again evaluated to provide an output signal for propagation to and evaluation by yet another stage in the circuit. Thus a domino effect is achieved whereby signals are sequentially propagated through an array of stages or domino blocks, and each successive stage performs an evaluation of an input condition until a final output is provided at a final output stage. Domino logic circuits may be arranged so that signals can propagate through the various stages without being separately clocked at each stage.

Figure 1:
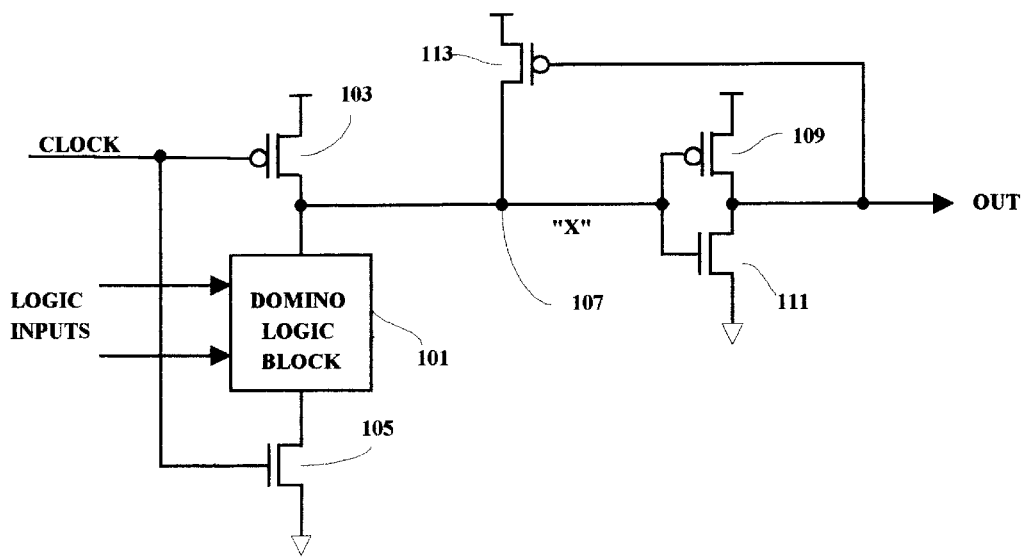
FIG. 1 is an exemplary domino circuit.

With reference to FIG. 1, there is shown an exemplary domino logic circuit arranged to receive one clock signal and two logic inputs, and provide one output signal. The example shows a PFET device 103 is connected between a logic 1 level potential (designated in the drawings by a single horizontal line) and a domino logic block circuit 101. The transistor 103 is arranged to receive the clock signal at its gate terminal and provide an output signal at node "X" 107, which is the common point between the transistor 103 and the domino logic block circuit 101. An NFET device 105 is connected between the domino logic block circuit 101 and a 0 or low logic level, which is also ground in the example. Transistor 105 has its gate terminal connected to the clock input. Node "X" 107 is connected to a common point which connects the input gate terminals of PFET device 109 and NFET device 111. Transistors 109 and 111 are connected in series between logic 1 and ground. The common point connecting the transistors 109 and 111 provides and output signal OUT and is also connected to the gate terminal of a pull-up PFET device 113. Transistor 113 is connected between a logic 1 level and the "X" node 107 and functions to selectively pull-up the node 107 to the logic 1 level.

Figure 2:
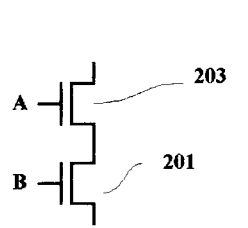
FIG. 2 is a schematic diagram of an exemplary implementation of an AND function which may be used in connection with the domino circuit illustrated in FIG. 1.
Figure 3:
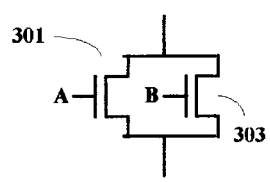
FIG. 3 is a schematic diagram of an exemplary implementation of an OR function which may be used in connection with the domino circuit illustrated in FIG. 1.
Figure 4:
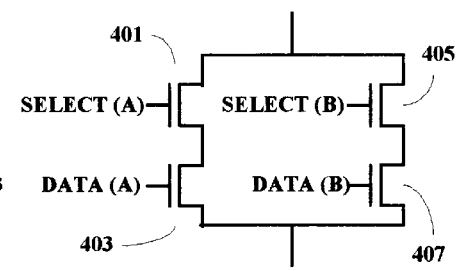
FIG. 4 is a circuit diagram of an exemplary implementation of a multiplex function which may be used in connection with the domino circuit illustrated in FIG. 1.

In FIG. 2, there is shown an exemplary AND gate comprising transistors 201 and 203 connected in series. Transistors 201 and 203 are arranged to plug into the domino logic block 101 shown in FIG. 1 to receive logic inputs A and B at their respective gate terminals and provide a logical AND function when both inputs are at a logic 1 level in the example. Similarly, FIG. 3 illustrates an OR gate comprising transistor 301 and 303 connected in parallel and arranged to be plugged into the domino logic block circuit 101 between the node 107 and the transistor 105. The OR gate would provide a logic 1 or high logic at its output terminals if either of its inputs A or B are at a logic 1 or high level in the present example. A MUX circuit is shown in FIG. 4. The MUX circuit includes a first set of series connected NFET devices 401 and 403 connected in parallel with a second set of series connected NFET devices 405 and 407. The MUX circuit is also designed to be plugged into the domino logic block 101 to provide a MUX function for two inputs A and B in the illustrated example.

In the examples illustrated above, it can be appreciated that an alpha particle hit could drain the charge at the internal node "X" 107 enough to switch the output inverter with its keeper device and the circuit will not be able to recover until the next cycle. An exemplary embodiment for a logic circuit solution to the alpha particle hit problem is shown in FIG. 5.

Figure 5:
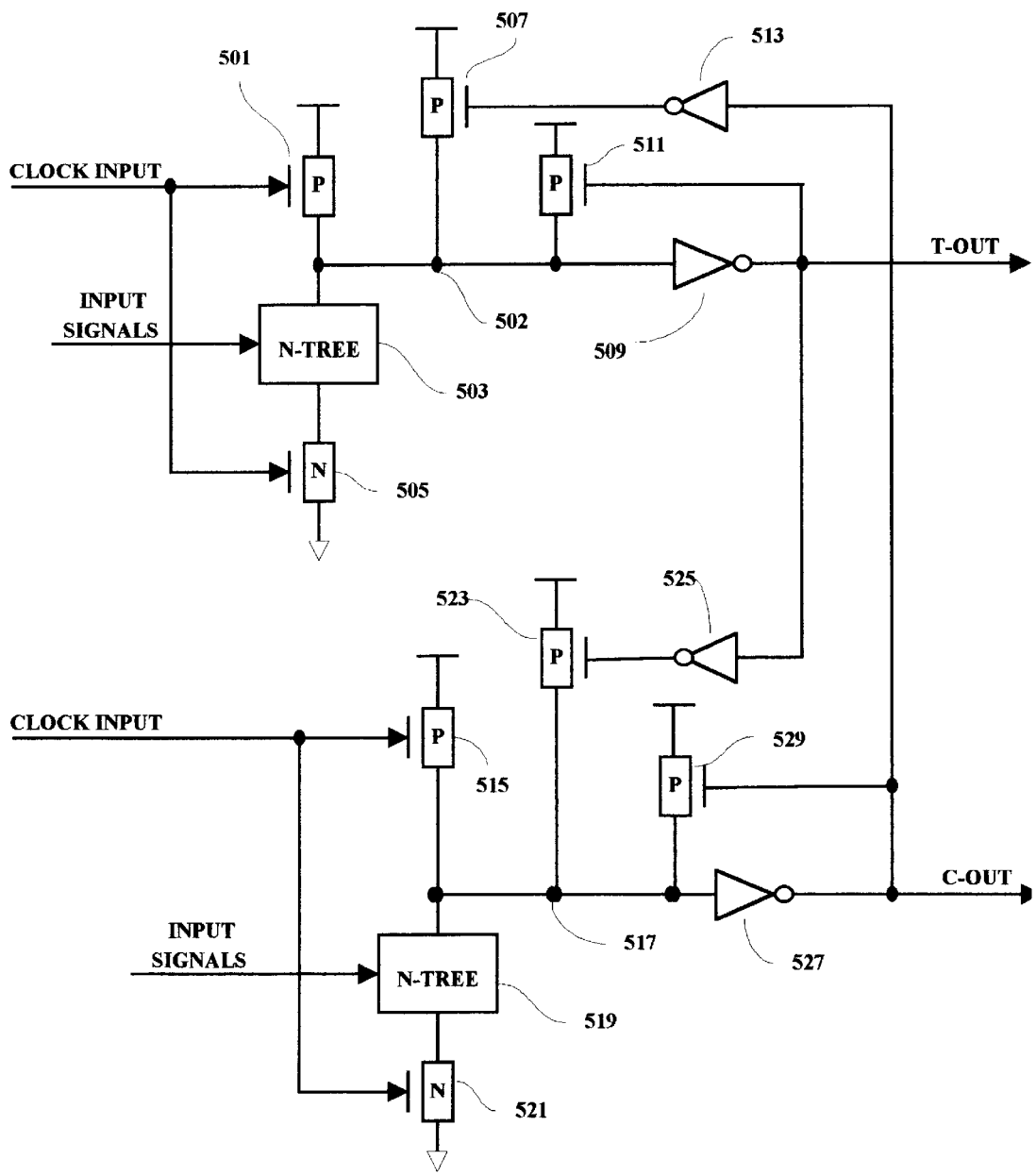
FIG. 5 is a schematic drawing of a logic circuit including the improved configuration of an exemplary embodiment of the present invention.

In FIG. 5, a dual rail dynamic circuit is illustrated. The dual rail terminology refers to the configuration in which a true logic output signal T-OUT is provided along with its complement output, designated herein as C-OUT. As shown in FIG. 5, a PFET device or PMOS transistor 501 in the present example, is connected between the logic 1 potential and the internal node 502. The transistor 501 is arranged to receive a clock input signal. A N-tree circuit 503, which corresponds to the dynamic logic block 101, is serially connected with an NFET device 505 between the internal node 502 and ground. The gate terminal of the NFET device 505 is also arranged to receive the clock input. The N-tree circuit 503 is arranged to receive input signals for processing. The internal node 502 is connected to an inverter 509 (corresponding to transistors 109 and 111 in FIG. 1), and the inverter is arranged to provide the T-OUT signal. A holding or keeper PFET device 511 is connected between the high logic potential and the internal node 502, and has its input terminal connected to the T-OUT node.

In the lower section of the dual rail configuration, a PFET device or PMOS transistor 515 in the present example, is connected between the logic 1 potential and an internal node 517. The transistor 515 is arranged to receive a clock input signal. A N-tree circuit 519 is serially connected with an NFET device 521 between the internal node 517 and ground. The gate terminal of the NFET device 521 is also arranged to receive the clock input. The N-tree circuit 519 is arranged to receive complement input signals for processing. The input signals applied to the N-tree 519 are complementary to the input signals applied to the N-tree 503 in the upper portion of the circuit. The internal node 517 is connected to an inverter 527 which is arranged to provide the C-OUT signal. A holding or keeper PFET device 529 is connected between the high logic potential and the internal node 517, and has its input terminal connected to the C-OUT node.

The dynamic circuit illustrated in FIG. 5 also includes two cross-coupled feedback circuits which are arranged to preserve the logic signal levels in the event of an alpha particle hit for example. In a first cross-coupled circuit, the C-OUT node in the lower or complementary circuit is connected to the input of an inverter 513. The output terminal of the inverter 513 is connected to a gate terminal of a PFET device 507. The PFET device 507 is connected between the high logic potential and the internal node 502. Similarly, in a second cross-coupled circuit, the T-OUT node in the upper or true logic circuit is connected to the input of an inverter 525. The output terminal of the inverter 525 is connected to a gate terminal of a PFET device 523. The PFET device 523 is connected between the high logic potential and the internal node 517 of the complementary side of the circuit.

Typically, in dynamic circuits, both in single rail and dual rail circuits, the internal node or top of the n-tree, is precharged high during the precharge phase of the clock.

During the evaluate phase, the internal node is in a high impedance state, and held high by the charged capacitance of that node. In other words there is no active device holding the node high. During that time, i.e. after the precharge phase and before the evaluate phase, an alpha particle hit could drain the charge at the internal node enough to switch the output inverter with its keeper device, and the circuit will not be able to recover until the next cycle. Note that in that event, the keeper device which is turned off, will remain so until the next precharge phase following the alpha particle hit.

In FIG. 5, one exemplary embodiment of the present invention is illustrated although other embodiments are possible using the disclosed concepts. FIG. 5 shows additional cross-coupled series connected circuits comprising first and second inverter-transistor pairs. The first cross-coupled circuit includes inverter 513 and PMOS transistor 507 and couples the output of the lower rail or complementary output circuit to the internal node of the upper rail or true output circuit. The second cross-coupled circuit includes inverter 525 and PMOS transistor 523 and couples the output of the upper rail or true output circuit to the internal node of the lower rail or complementary output circuit. The dual rail approach in general, is known and used to achieve the best performance. In a typical operation without the cross-coupled circuitry, if the storage node in the upper section is storing a 1 level, and an alpha particle hits the circuit, the alpha particle hit will cause a discharge and a resulting error. However, with the cross-coupled circuitry, device 507 will turn on, thus preventing the 1 state from being discharged from internal node 502. In a similar fashion, the storage node 517 of the lower or complementary side of the logic circuit is also protected from alpha particle hits by the action of PMOS transistor 523 using the output signal T-OUT.

Figure 6:
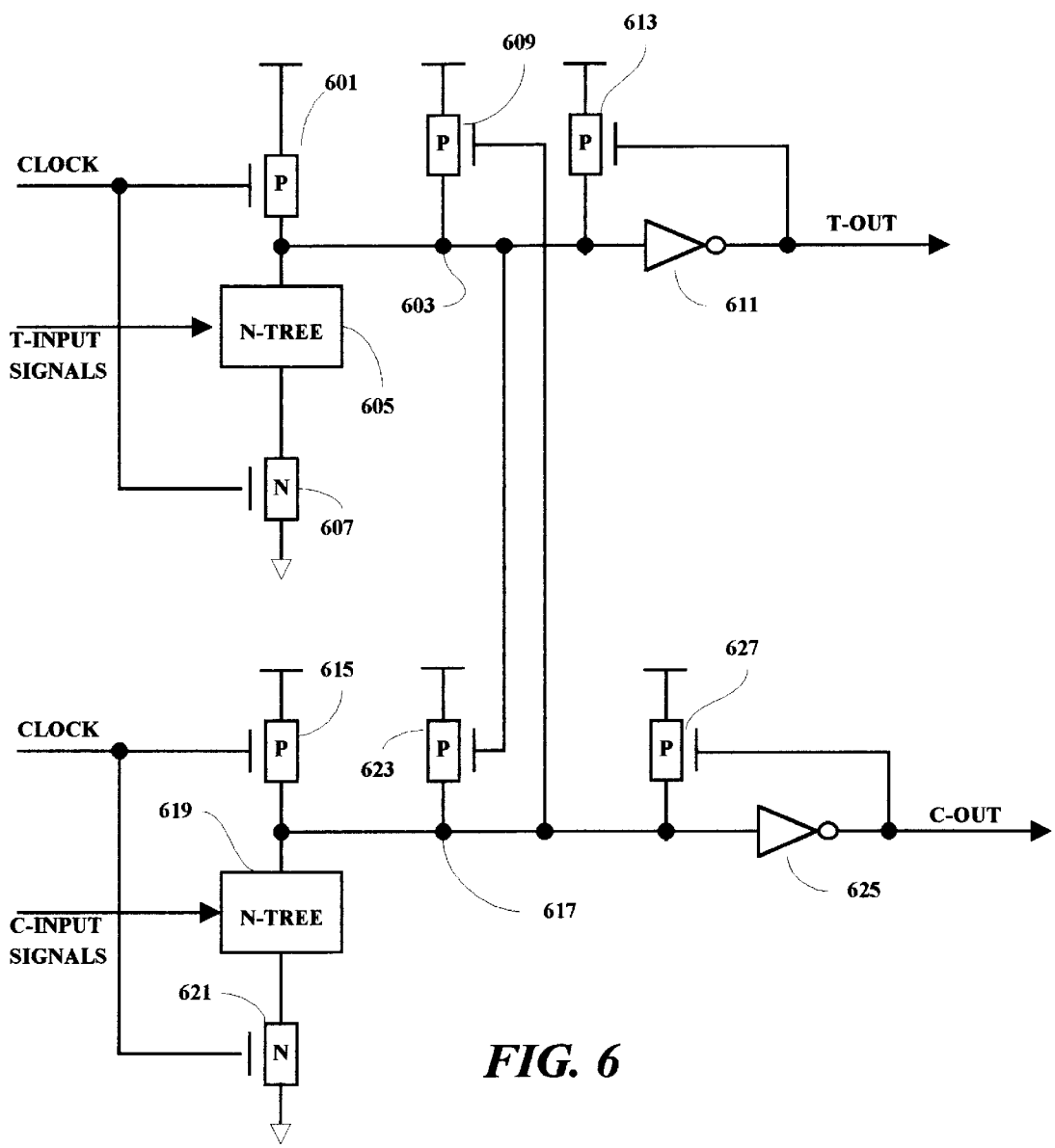
FIG. 6 is a schematic drawing of a logic circuit including the improved configuration of another exemplary embodiment of the present invention.

In FIG. 6, another dual rail dynamic circuit is illustrated. As shown in FIG. 6, a PFET device or PMOS transistor 601 in the present example, is connected between the logic 1 potential and the internal node 603. The transistor 601 is arranged to receive a clock input signal. A N-tree circuit 605, which corresponds to the dynamic logic block 101, is serially connected with an NFET device 607 between the internal node 603 and ground. The gate terminal of the NFET device 607 is also arranged to receive the clock input. The N-tree circuit 605 is arranged to receive input signals for processing. The internal node 603 is connected to an inverter 611 (corresponding to transistors 109 and 111 in FIG. 1), and the inverter 611 is arranged to provide the T-OUT signal. A holding or keeper PFET device 613 is connected between the high logic potential and the internal node 603, and has its input terminal connected to the T-OUT node.

In the lower section of the dual rail configuration shown in FIG. 6, a PFET device or PMOS transistor 615 in the illustrated example, is connected between the logic 1 potential and an internal node 617. The transistor 615 is arranged to receive a clock input signal. A N-tree circuit 619 is serially connected with an NFET device 621 between the internal node 617 and ground. The gate terminal of the NFET device 621 is also arranged to receive the clock input. The N-tree circuit 619 is arranged to receive complement input signals (C-INPUT) for processing. The input signals applied to the N-tree 619 are complementary to the input signals applied to the N-tree 605 in the upper portion of the circuit. The internal node 617 is connected to an inverter 625 which is arranged to provide the C-OUT signal. A holding or keeper PFET device 627 is connected between the high logic potential and the internal node 617, and has its input terminal connected to the C-OUT node.

The dynamic circuit illustrated in FIG. 6 also includes two cross-coupled feedback circuits which are arranged to preserve the logic signal levels in the event of an alpha particle hit for example. In a first cross-coupled circuit, the internal node 617 of the lower or complementary circuit is connected to the input of a PFET device 609 in the upper portion of the circuit. The PFET device 609 is connected between the high logic potential and the internal node 603 of the upper portion of the logic circuit. Similarly, in a second cross-coupled circuit, the internal node 603 in the upper or true logic circuit is connected to the input of a PFET device 623 in the lower portion of the circuit. The PFET device 623 is connected between the high logic potential and the internal node 617 of the complementary or lower side of the circuit. In FIG. 6, the second exemplary embodiment of the present invention takes the input for the cross-coupled circuits from different points in the referenced circuits and requires fewer parts than the FIG. 5 example, but operates in a similar fashion as described in connection with the FIG. 5 example to achieve substantial immunity from soft errors which may otherwise be caused by alpha particle collisions as hereinbefore described.

The method and apparatus of the present invention has been described in connection with a dual-rail logic system in a preferred embodiment as disclosed herein. Although an embodiment of the present invention has been shown and described in detail herein, along with certain variants thereof, many other varied embodiments, including single rail implementations, that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A combination comprising:

a signal processing circuit;

input terminal means arranged to receive input signals for processing;

output terminal means connected to said processing circuit, said processing circuit being selectively operable to process said input signals and provide an output signal at said output terminal means, said output signal being of an electrical state representative of one of a plurality of detectable relationships among the input signals, said processing circuit including an internal node and an output inverter circuit, said output inverter circuit having an input coupled to said internal node, said output inverter circuit further having an inverter output terminal coupled to said output terminal means; and a restoring circuit connected between said output terminal means and said internal node, said restoring circuit being selectively operable in response to an untimely change in said output signal to initiate a circuit operation to restore said output signal to said electrical state which existed prior to said untimely change.

2. The combination as set forth in claim 1 wherein said restoring circuit includes at least one active device.

3. The combination as set forth in claim 2 wherein said active device is a field effect transistor.

4. The combination as set forth in claim 3 wherein said field effect transistor is a P-type field effect transistor.

5. The combination as set forth in claim 4 wherein said active device is a PMOS transistor.

6. The combination as set forth in claim 1 wherein said processing circuit is a logic processing circuit.

7. The combination as set forth in claim 6 wherein said logic processing circuit comprises an AND gate.

8. The combination as set forth in claim 6 wherein said logic processing circuit comprises an OR gate.

9. The combination as set forth in claim 1 wherein said logic processing circuit comprises an MUX circuit.

10. The combination as set forth in claim 1 wherein said processing circuit comprises a domino circuit.

11. The combination as set forth in claim 1 wherein said processing circuit is a dual rail logic circuit, said dual rail logic circuit comprising a first processing section for processing a first set of said input signals and providing a first output signal at a first output terminal of said output terminal means, said dual rail logic circuit further including a second processing section for processing a complementary set of said input signals, said complementary set of said input signals being complements of said first set of input signals, said second processing section being arranged for processing said complementary set of input signals and provide a second output signal, complementary to said first output signal, at a second output terminal of said output terminal means.

12. A combination comprising:

a signal processing circuit;

input terminal means arranged to receive input signals for processing;

an output terminal means connected to said processing circuit, said processing circuit being selectively operable to process said input signals and provide an output signal at said output terminal means, said output signal being of an electrical state representative of one of a plurality of detectable relationships among the input signals; and a restoring circuit connected to said processing circuit, said restoring circuit being selectively operable in response to an untimely change in said output signal to initiate a circuit operation to restore said output signal to said electrical state which existed prior to said untimely change, said processing circuit comprising a dual rail logic circuit, said dual rail logic circuit further comprising a first processing section for processing a first set of said input signals and providing a first output signal at a first output terminal of said output terminal means, said dual rail logic circuit further including a second processing section for processing a complementary set of said input signals, said complementary set of said input signals being complements of said first set of input signals, said second processing section being arranged for processing said complementary set of input signals and provide a second output signal, complementary to said first output signal, at a second output terminal of said output terminal means, said first processing section including a first internal node coupled to said first output terminal, and said second processing section including a second internal node coupled to said second output terminal, said restoring circuit comprising a first switching circuit connected between said first output terminal and said second internal node, said restoring circuit further comprising a second switching circuit connected between said second output terminal and said first internal node.

13. The combination as set forth in claim 12 wherein said first switching circuit includes an inverter device and a first switching device, said inverter device being serially connected with said first switching device.

14. A combination comprising:

a signal processing circuit;

input terminal means arranged to receive input signals for processing;

output terminal means connected to said processing circuit, said processing circuit being selectively operable to process said input signals and provide a first output signal at a first output terminal of said output terminal means, said first output signal being of an electrical state representative of one of a plurality of detectable relationships among the input signals; and a restoring circuit connected to said processing circuit, said restoring circuit being selectively operable in response to an untimely change in said first output signal to initiate a circuit operation to restore said first output signal to said electrical state which existed prior to said untimely change, said processing circuit comprising a dual rail logic circuit, said dual rail logic circuit further comprising a first processing section for processing a first set of said input signals and providing said first output signal, said dual rail logic circuit further including a second processing section for processing a complementary set of said input signals, said complementary set of said input signals being complements of said first set of input signals, said second processing section being arranged for processing said complementary set of input signals and provide a second output signal, complementary to said first output signal, at a second output terminal, said second processing section further including an internal node coupled to said second output terminal, said restoring circuit comprising a switching circuit connected between said internal node of said second processing section and said first output terminal.

15. The combination as set forth in claim 14 wherein said switching circuit includes an inverter device and a switching device, said inverter device being serially connected with said second switching device between said first output terminal and said node of said second processing section.

16. A method for restoring a logic signal level to a logic circuit node upon an occurrence of an untimely change in said signal level at said node, said method comprising:

sensing said untimely change in said logic signal level at said node; and applying said logic signal level to said logic circuit node to restore said logic signal level upon sensing said untimely change in said signal level at said node.

17. The method as set forth in claim 16 and further including:

connecting a switching device between a source of said logic signal level and said logic circuit node;

providing a restore signal upon sensing said untimely change; and applying said restore signal to said switching device to effect a connection between said source and said logic circuit node thereby restoring said logic signal level to said logic circuit node.

\* \* \* \* \*